United States Patent [19]

Ernst et al.

[11] Patent Number: 4,549,999
[45] Date of Patent: Oct. 29, 1985

[54] COOLING TOWER

[75] Inventors: Gunter Ernst, 57 Strasse des Roten Kreuzes, Karlsruhe, Fed. Rep. of Germany; Edmund Baer, Karlsruhe, Fed. Rep. of Germany; Dieter Wurz, Pfinztal, Fed. Rep. of Germany; Hans Dittrich, Karlsruhe, Fed. Rep. of Germany

[73] Assignee: Gunter Ernst, Fed. Rep. of Germany

[21] Appl. No.: 229,513

[22] Filed: Jan. 29, 1981

Related U.S. Application Data

[60] Continuation-in-part of Ser. No. 28,659, Apr. 10, 1979, abandoned, and a continuation-in-part of Ser. No. 147,264, May 5, 1980, which is a continuation-in-part of Ser. No. 932,431, Aug. 10, 1978, abandoned, which is a continuation of Ser. No. 756,982, Jan. 5, 1977, abandoned, which is a continuation of Ser. No. 557,350, Mar. 11, 1975, abandoned, said Ser. No. 147,264, is a continuation-in-part of Ser. No. 971,895, Dec. 21, 1978, abandoned, which is a continuation of Ser. No. 832,688, Sep. 12, 1977, abandoned, which is a division of Ser. No. 756,982, Jan. 5, 1977, abandoned.

[51] Int. Cl.$^4$ .............................................. B01F 3/04
[52] U.S. Cl. .............................. 261/109; 261/DIG. 11
[58] Field of Search .................................... 261/94–98, 261/DIG. 11, 109, 104, DIG. 77; 110/184; 114/187; 104/52; 98/58, 60, 70, 73, 78, 81, 83, 84; 165/DIG. 1

[56] References Cited

U.S. PATENT DOCUMENTS

| | | | |
|---|---|---|---|
| 3,299,619 | 1/1967 | Terry | 261/DIG. 11 |
| 3,385,197 | 5/1968 | Greber | 261/109 |
| 3,400,917 | 9/1968 | Richards | 261/DIG. 11 |
| 3,422,883 | 1/1969 | Daltry | 261/DIG. 11 |
| 3,759,496 | 9/1973 | Teller | 261/DIG. 11 |

FOREIGN PATENT DOCUMENTS

| | | | |
|---|---|---|---|
| 542261 | 12/1931 | Fed. Rep. of Germany | 261/DIG. 11 |
| 2154530 | 2/1973 | Fed. Rep. of Germany | 261/DIG. 11 |
| 2414172 | 12/1978 | Fed. Rep. of Germany | 261/DIG. 11 |
| 2815830 | 10/1979 | Fed. Rep. of Germany | 261/DIG. 11 |
| 25053 | of 1909 | United Kingdom | 261/DIG. 11 |
| 320505 | 10/1929 | United Kingdom | 261/DIG. 11 |
| 418320 | 10/1934 | United Kingdom | 261/DIG. 11 |
| 492540 | 9/1938 | United Kingdom | 261/DIG. 11 |
| 1183193 | 3/1970 | United Kingdom | 261/DIG. 11 |
| 257521 | 12/1970 | U.S.S.R. | 261/DIG. 11 |

Primary Examiner—Richard L. Chiesa
Attorney, Agent, or Firm—L. Lawton Rogers, III

[57] ABSTRACT

A cooling tower is provided with a crown inwardly tapered towards the upper discharge opening defined by the upper rim of the crown to create a pressure differential greater on the inside than on the outside of the crown to inhibit cold air break-ins in still air or winds of low velocity. The cooling tower shell is tapered inwardly in the crown region and the angle between the tangent to the internal contour and the vertical in said crown region of the shell is preferably chosen to be not smaller than results from the following equation:

$$\tan\alpha(z) = \frac{1}{4} \cdot \frac{\rho_a - \rho_i}{\rho_i} \cdot g \cdot \frac{d_0}{w_0^2} \cdot \left(\frac{d(z)}{d_0}\right)^5 \qquad (1)$$

in which $\alpha$ is the angle in question, g is the acceleration due to gravity, $\rho_a$ and $\rho_i$ are the gas densities inside (i) and outside (a) of the cooling tower, z is the vertical coordinate, $d_o$ and $d(z)$ are the diameters of the internal shell contour at the level $z=o$ and z, respectively, and $w_o$ is the gas velocity at the level $z=o$. By this equation, the cooling tower designer may provide for shell contours which for all sizes of cooling towers on the one hand safely prevents cold air penetration and on the other hand warrants a minimum of draft losses in operation of the cooling tower.

To reduce the effect of side winds of high velocity, the crown may carry a wind-deflector ring with an upwardly-inclined deflecting surface to inhibit the creation of a vortex over the tower.

9 Claims, 17 Drawing Figures

FIG. 17

COOLING TOWER

RELATED APPLICATIONS

This application is a continuation-of-part of (a) now abandoned Application Ser. No. 28,659 filed Apr. 10, 1979 and co-pending (b) Application Ser. No. 147,264 filed May 5, 1980 which is a continuation-in-part of application Ser. No. 932,431 filed Aug. 10, 1978, which is a continuation of application Ser. No. 756,982 filed Jan. 5, 1977 which is a continuation of application Ser. No. 557,350 filed Mar. 11, 1975, all now abandoned. Application Ser. No. 147,264 is also a continuation-in-part of application Ser. No. 971,895 filed Dec. 21, 1978 which is a continuation of application Ser. No. 832,688 filed Sept. 12, 1977 which is a division of application Ser. No. 756,982 filed Jan. 5, 1977, all now abandoned.

BACKGROUND OF THE INVENTION

This invention relates to natural draught cooling towers and to a method and apparatus for preventing cold air break-ins at low wind velocities and the formation of a vortex over the tower at high wind velocities.

Natural draught cooling towers are well known. The purpose of a natural draught cooling tower is to extract the heat from the heated coolant water of a thermal power station, a manufacturing process, or the like. The coolant water gives off its heat to the ambient air which is conveyed upwardly in the cooling tower by the natural uplift of the ambient air being heated in the cooling tower.

As is well known, the cooling tower separates the relatively warmer air within the tower from the relatively cooler air outside the tower. As the heated air rises within the tower, the heavier cooler air is pulled into the tower at the lower end for warming. The tower must, of course, have a side wall which is closed, i.e. without apertures, to maintain the separation of the two air masses. The difference in the temperature of the two air masses is reflected in their pressure and the pressure differential between the air inside and outside of the cooling tower is a maximum at the bottom of the tower and decreases as a function of the height of the tower to the crown where the pressures are the same.

Prior to the present invention, the crown portion of cooling towers was enlarged to have effect as a diffusor and thus to increase the effectiveness of the cooling tower by a partial regeneration of pressure energy. The hyperbolic shape has become the standard. The universally adopted rule has been to avoid acceleration of the plume beyond that necessary to generate the required uplift. See, for example, the article "Gegenwärtige Kühlturmtechnik" ("Cooling Tower Techniques of Today") by Dr. Ing. Paul Berliner, Karlsruhe in the Journal "Wärme" (Heat) pp. 25–29, Vol. 80, 1974.

The phenomenon of cold air penetration downwardly into the top of the cooling tower in still air generally has not been considered a problem. However, recent studies of the inventors have shown that cold ambient air in still air conditions flows into the tower to form a ring inside the crown of the cooling tower. Since the pressure inside and outside the tower is thus equalized to the extent of the cold air penetration, the crown position of the tower is not effective and the effective height of the tower is decreased. The plume is accelerated and the air flow from the tower is diminished.

These recent investigations (published in Fortschrittsberichte V.D.I.-Z., Series 15, No. 5, July, 1974) have shown that the weather conditions can substantially influence the functioning of the cooling tower. As discussed above, the known cylindrical and hyperbolic forms of cooling tower promote, in low wind velocities, the pentration of colder and therefore heavier air into the outlet opening at the top of the cooling tower. As a result, the effective height of the cooling tower can be reduced by up to 25% and more. A second and related problem exists with high wind velocities, where the wind produces a dead region in the form of a flow vortex in the cooling tower outlet. This vortex partially obstructs the cooling tower outlet and, with a wind velocity of 20 m/s, can reduce the effective uplift height of the cooling tower as much as 30%.

The present invention has as a principal object the development of a novel cooling tower in which the effects of weather conditions on the performance of the tower are significantly reduced.

In regard to cold air penetration, one feature of the invention is to provide a cooling tower having a crown tapered inwardly towards the upper opening rim. In this connection, the term "crown" is used to mean the upper end portion of the cooling tower wall, having an axial length which is small in comparison with the total height of the tower.

The new cooling tower of the present invention is designed so that the pressure gradients in the tapered crown region of the cooling tower show the following relative behavior inside and outside the cooling tower in still air and wind velocities less than about 10 m/s:

$$\left(\frac{\delta p}{\delta z}\right)_i \geq \left(\frac{\delta p}{\delta z}\right)_a \tag{2}$$

in which p=pressure, i=inside the tower, a=outside and z=the vertical height coordinates measured downwardly from the upper rim of the crown. In the tapered crown region, there is produced a barrier layer, which prevents the penetration of cold air, because the sum of the specific gravity of the heated plume and volume-related inertia forces is greater than the specific gravity of the cold outside air.

It is an important advantage that the tapered region, initiated with a bend or angle, stiffens the casing of the cooling tower, so that it is possible to dispense with the usual stiffening or reinforcing ring which surrounds the crown of conventional cooling towers.

As regards the design in practice, there are also to be taken into account the different temperatures, gas constants and densities of the media inside and outside the cooling tower. The tower itself must have a height of at least 80 m. to provide the necessary updraught and the interior thereof should be free of corners. The height H (axial length) of the tapered crown region is determined, in practice, to be between 3% and 10% of the total height of the cooling tower, preferably 5%. The ratio between height H of the cooling tower crown and the largest diameter D of the crown, i.e., the diameter at the lower end thereof, may be between about 1 to 12 and about 1 to 3.

One suitable height-diameter ratio H/D is in the order of magnitude of 1 to 7. With this H/D ratio, a ratio $F_2/F_1$ between the largest cross-sectional area $F_1$ at the bottom of the crown and the smallest cross-sectional area $F_2$ at the top of the crown of about 4/5 would be appropriate in order to produce the required pressure gradients for a cooling tower with D of about 40 m. The average slope angle of the tapered crown region is also fixed by the ratios H/D and $F_2/F_1$.

A particularly simple construction may be provided when the tapered crown region is conical with straight surface lines. This construction can be produced cheaply and simply, for example by a sheet metal construction. The usual concrete construction can, however, also be used. Alternatively, the crown region may have a continuously curved contour or a contour which is composed of straight sections of different slope.

The design of the cooling tower as thus far described serves mainly for the purpose of preventing cold air penetrations or break-ins at relatively low wind velocities and thus the loss in uplift which is connected therewith. This design is more particularly proposed for cooling towers with natural uplift since the flow of air from forced draught towards is generally at a velocity which would prevent such cold air penetration.

Any tapering of the shell causes acceleration, as a result of which losses will be suffered in draft and thus in efficiency. Therefore, the tapering should be as limited as possible in height and angle with respect to the vertical. On the other hand, the tapering must be sufficient for a positive prevention of penetrations of cold air which may lead to efficiency losses of up to 25%. Thus there exists a need for optimum design specifications regarding the tapering of the internal contour of the shell in the crown region. Beyond the general teaching mentioned above, these should permit the realization of the optimum crown layout in any individual case.

The invention also has for an object to provide the cooling tower designer with design rules which will permit him to determine optimum dimensions for the tapered crown region in case of any absolute cooling tower dimensions and operating conditions occurring in practice, with the consequence that cold air penetrations are prevented positively and, at the same time, the losses in draft caused by the tapering are kept small.

As to the mitigation of the harmful influences of a strong side wind (more than approximately 10 m/s), the cooling tower of the present invention includes a wind-deflecting means having upwardly-sloping deflector surfaces in the crown region adjacent the rim of the cooling tower.

This third feature may be provided in association with the cooling tower crown as described above. The combined use of both features is particularly useful in a natural draught cooling tower. A cooling tower embodying both of these features of the present invention can be operated with optimal efficiency in still air or relatively low wind velocities to avoid the cold air penetrations which then tend to occur, and also with a strong side wind to avoid the partial obstruction of the outlet flow which is generally connected therewith.

Under weather conditions in which cold air penetrations play a subordinate part, but in which there is frequently a high side wind, a design with the wind-guiding means but without the tapered region may be sufficient. This wind deflecting design, moreover, may also be used with cooling towers having artificially generated uplift.

A design of the cooling tower with the tapered crown region alone but without the wind deflecting means is to be preferred under weather conditions in which there is only seldom a side wind and certainly not a high one.

Further objects and advantages of the invention will be apparent from the claims and from the following more detailed explanation of the invention with reference to the several embodiments shown in the accompanying diagrammatic drawings.

DESCRIPTION OF PREFERRED EMBODIMENTS

Figure 1:
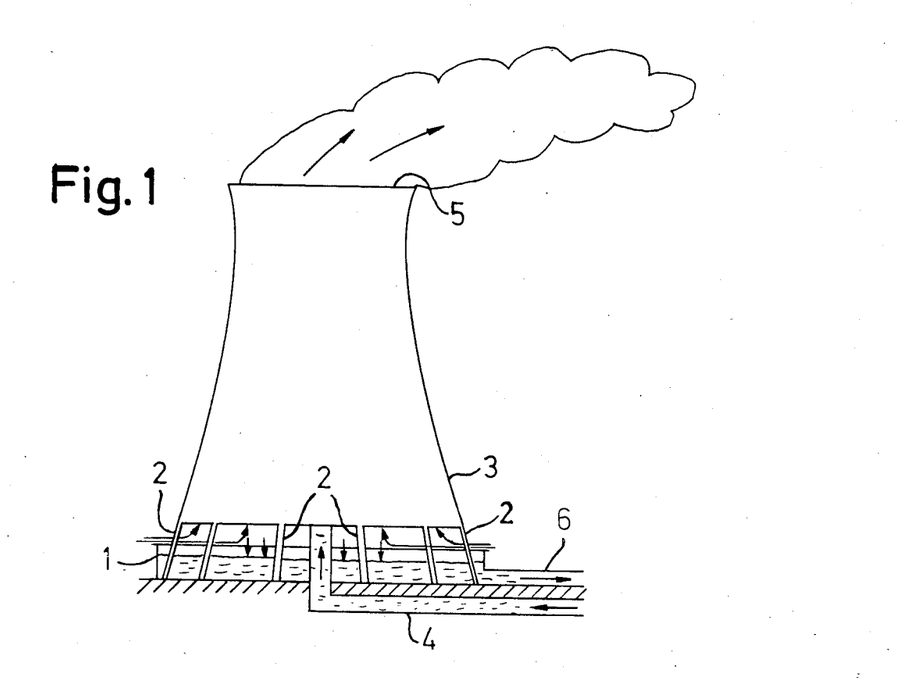
FIG. 1 is a side elevation, partially in section, of a conventional hyperbolic cooling tower.

FIG. 1 shows a conventional natural draught cooling tower, i.e., a cooling tower with naturally produced uplift. The foundation of the cooling tower is formed by a collecting tank 1 for the cooled water. Resting on the bottom of this collecting tank 1 are supports 2, which carry the cooling tower wall 3 with the trickler fillings which are not shown. The water which has become heated, for example, the water coming from a thermal power station, is supplied to these trickler units through a duct 4. The water falls from the trickler units into the collecting tank 1 and is consequently cooled by the ambient air penetrating between the supports 2. Consequently, the ambient air is heated, so that it assumes a lower density in the cooling tower and ascends in the latter. The "vapor" discharges from the opening defined by the rim 5 of the crown of the cooling tower. The cooled water is returned through the duct 6 from the collecting tank 1 to the thermal power station.

The conventional cooling tower is initially convergent in its lower part, and then widens out hyperbolically above a constricted portion to the rim 5 of the opening. Measurements undertaken by the inventors have shown that, with still air or low wind velocities, penetrations of cold air can seriously impair the discharge of the vapor and that, with higher wind velocities, the outlet opening can be at least partially obstructed, in the prevailing side wind direction, by a horizontal flow vortex being established in the outlet opening on the windward side, i.e., on the side from which the wind blows.

Figure 2:
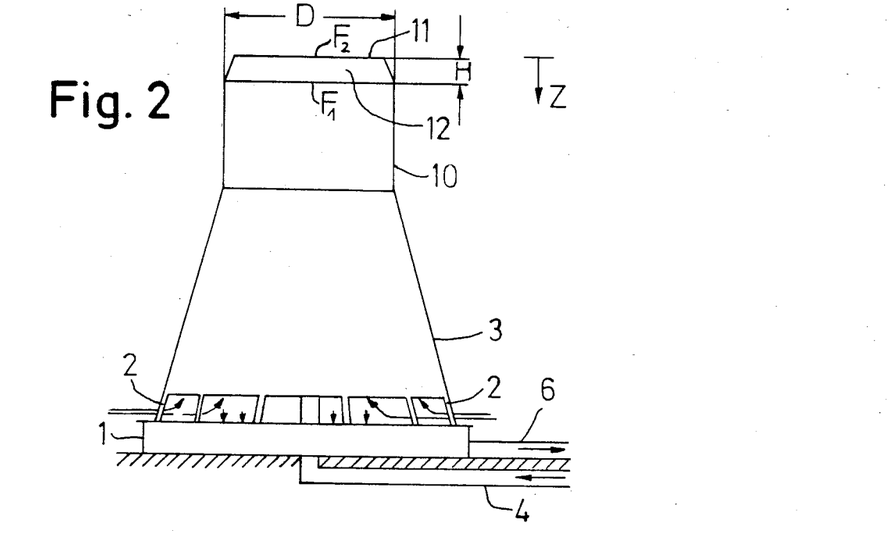
FIG. 2 is a side elevation of a cooling tower according to the present invention.

FIG. 2 shows a cooling tower which is constructed in the lower region in the same way as the conventional cooling tower according to FIG. 1. In the lower region, the wall 3 is likewise made conical, like the cooling tower according to FIG. 1. However, the conical region is followed by a cylindrical region 10, which latter is followed by a crown region 12 which is conically tapered towards the upper opening rim 11. The ratio H/D between the height H and the largest diameter D of this tapered region 12 amounts to approximately 1/6, and the ratio $F_2/F_1$ between the smallest cross-sectional area $F_2$, which at the same time represents the outlet cross-section of the cooling tower, and the largest cross-sectional area $F_1$ of the tapered region 12 amounts to 4/5 with an average diameter of the cooling tower of about 40 m. If the absolute velocity increases at substantially constant air flow in the cooling tower with an absolute diameter D, the ratio $F_2/F_1$ may be made greater in accordance with the findings of the inventors.

The crown region 12 joins the cylindrical region 10 at an oblique angle forming a circumferential ridge of "chine" which produces a desirable stiffening effect. The taper in the crown region results in the pressure gradients $\delta p/\delta z$ in the downward vertical direction z from the rim inside the cooling tower being greater than the pressure gradients on the outside of the tower. This overpressure prevents penetrations of cold air into the opening 11 when the air is still and when the wind velocities are low.

Figure 3:
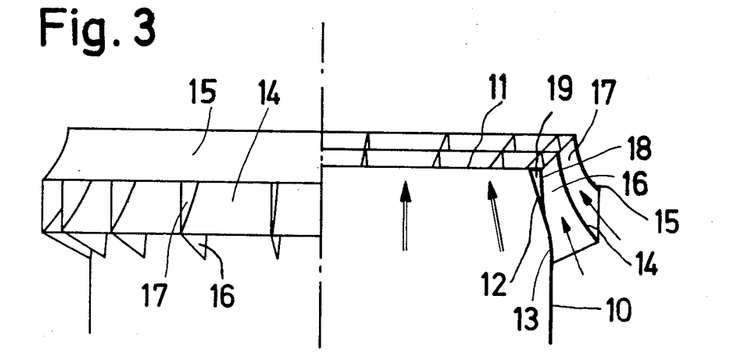
FIG. 3 is a side elevation, partly in section and to a larger scale, of the crown of a cooling tower designed according to the present invention.
Figure 4:
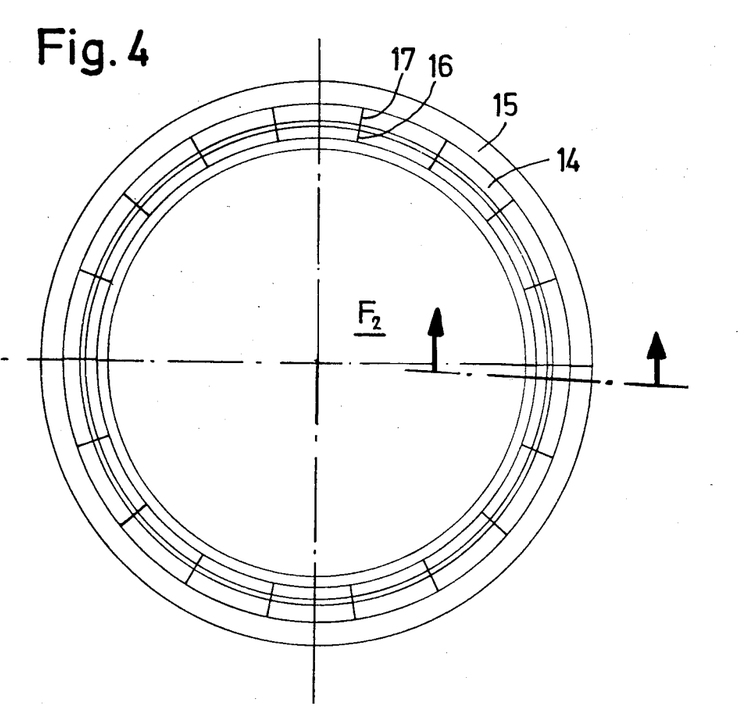
FIG. 4 is a top plan view of the cooling tower according to FIG. 3.

FIG. 3 represents only the crown of a cooling tower, shown in section in the right half, the tower being additionally provided with a wind-deflector. A portion of this right half shown in section is represented on a larger scale in FIG. 5. In the same way as in the cooling tower in FIG. 2, the crown in FIG. 3 comprises a tapered region 12 which follows and adjoins a cylindrical region 10 and of which the smallest cross-section is formed by the area $F_2$ enclosed by the opening rim 11. The cylindrical region 10 and tapered region 12 merge into one another by way of a rounded portion 13. As is the case throughout the cooling tower, it is important that surfaces merge smoothly into each other to avoid the creation of turbulent air flow in the tower.

Arranged on the outside of the tapered region 12 and coaxial with the cooling tower are two encased guide vanes 14, 15, with upwardly and inwardly extending flow ducts These ducts have a convex curvature towards their upper, almost vertical outlet ends and are separated by radial walls 16, 17. At their bottom inlets the longitudinal axes of the flow ducts have radially-inwardly directed horizontal components which are larger than at their outlets.

It is not the sloping wall of the tapered region 12 which is used as the inner boundary of the inner guide vane ring 14, but an annular wall 18 which is mounted thereon and which is provided for this purpose, the upper end portion of the said wall being directed substantially vertically. With a sheet metal construction as illustrated, a cavity 19 is thus formed between the tapered wall region 12 and the annular wall 18. This cavity construction, having two walls 12 and 18 supplemented by a ring 18' closing the upper end. This closed cavity is also desirable for static building reasons.

Figure 5:
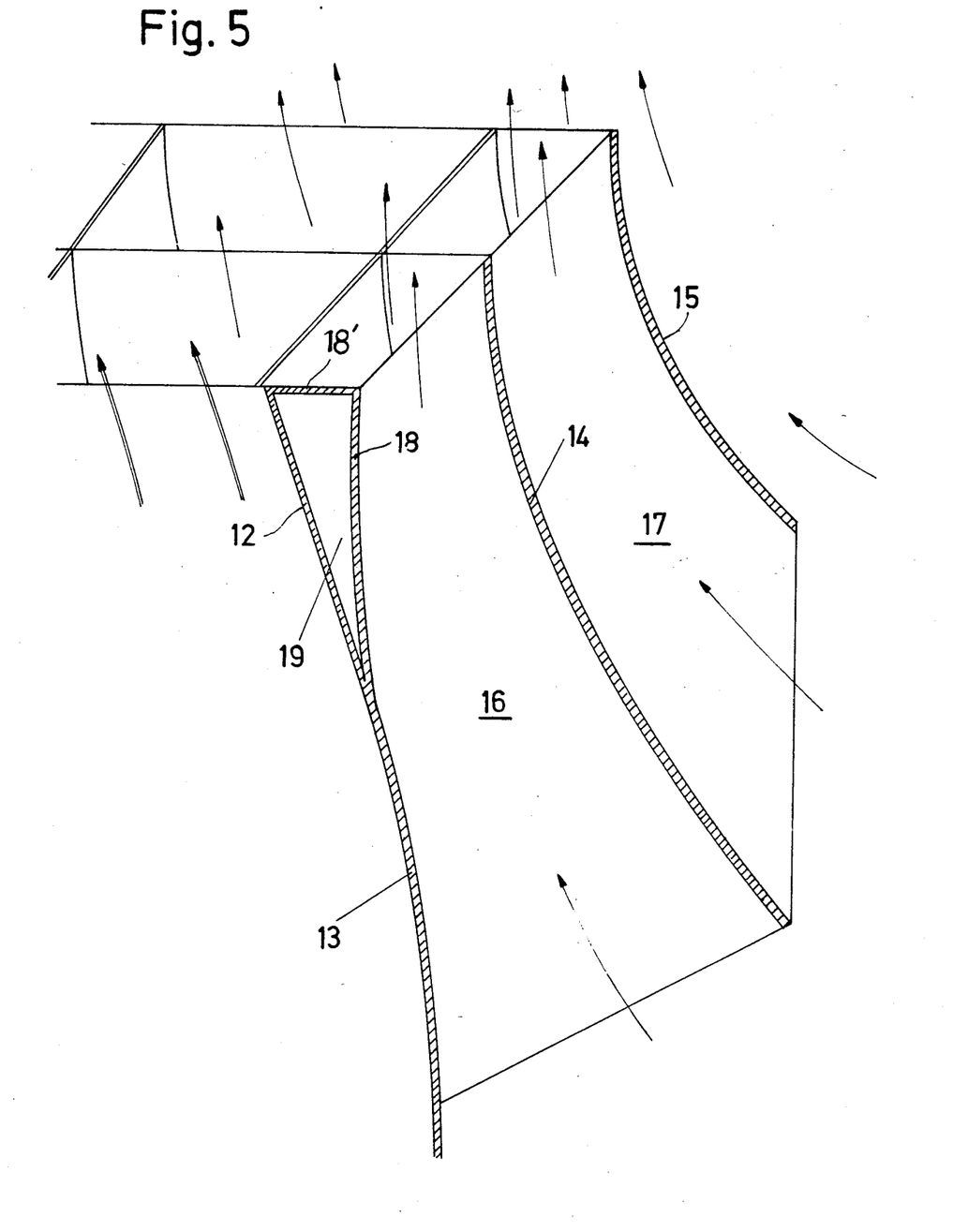
FIG. 5 is a partial section to an even larger scale through a detail of the cooling tower crown according to FIG. 3.

The guide vane rings deflect the side wind in an upward direction represented by the arrows having a single-line shaft in FIGS. 3 and 5, while the vapor discharges in the direction of the arrows having a two-line shaft. The establishment of a flow vortex extending horizontally in the outlet cross-section of the cooling tower is thus prevented by the guide vane rings at winds of high velocity.

A simple guide vane ring also already provides an improvement in conditions of high wind velocities. In another modified construction shown in FIG. 9, a wind-deflector is arranged facing only in the prevailing wind direction, on the outer circumference of the cooling tower crown. This wind-deflector can, for example, be operated by means of a conventional drive means (not shown) or by the wind itself, so as to be rotatable about an external ring gear 51 extending cirumferentially around the crown.

Figure 9:
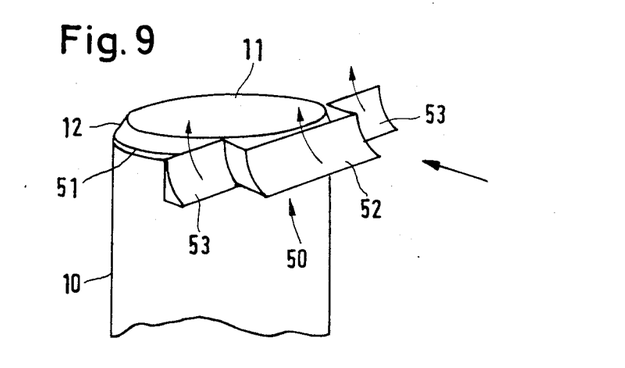
FIG. 9 is a perspective view of the upper part of a cooling tower with another form of wind-deflector.

Although the wind-deflector 50 in the constructional form shown in FIG. 9 is constructed in three parts, with a central defelctor part 52 extending tangentially with respect to the rim 11 of the opening and two lateral deflector parts 53 extending parallel thereto in a chordal direction, the wind-deflector means can also comprise a single deflector part or consist of more than three deflector parts, and furthermore may be arranged in a fixed position if the wind, on average through the year, approaches the position at which the tower is erected mainly from one direction.

Figure 6:
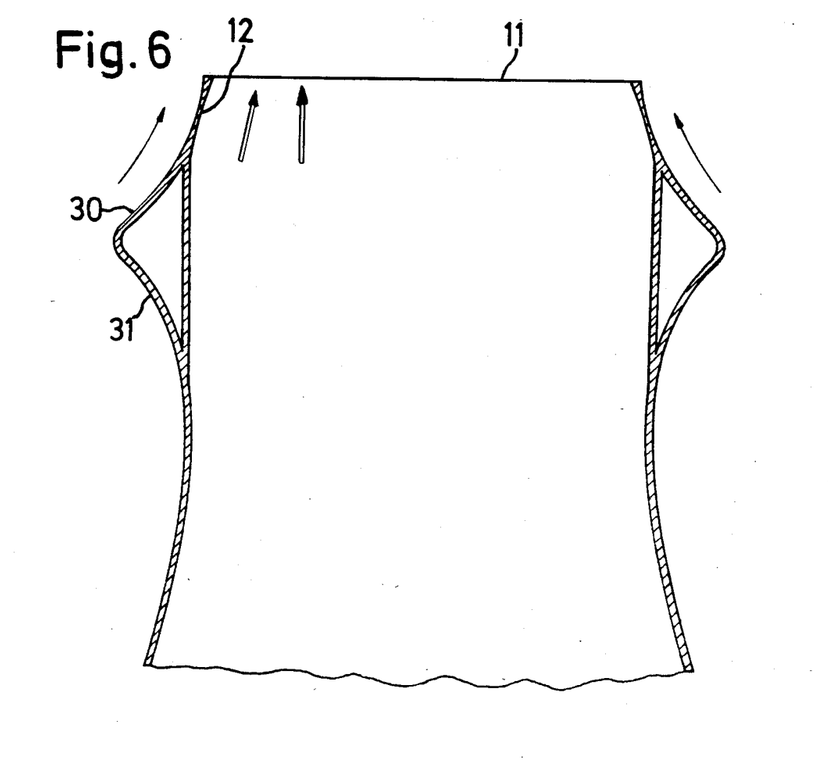
FIG. 6 is a section through the crown of a second embodiment of the cooling tower according to the present invention.

With the construction according to FIG. 6, there is provided a simple, annular wind-deflecting surface 30 instead of guide vanes. This wind-deflecting surface 30 extends nearly vertically at its upper part, so that it also imparts a vertical component to the lateral wind at the opening rim 11 of the cooling tower. This vertical component prevents the formation of a horizontal flow vortex when the side wind is strong. The wind-deflecting surface 30 is supported on its underside by a wall 31 merging smoothly into the wall of the cooling tower. This construction also greatly enhances the structural stability of the tower.

Figure 7:
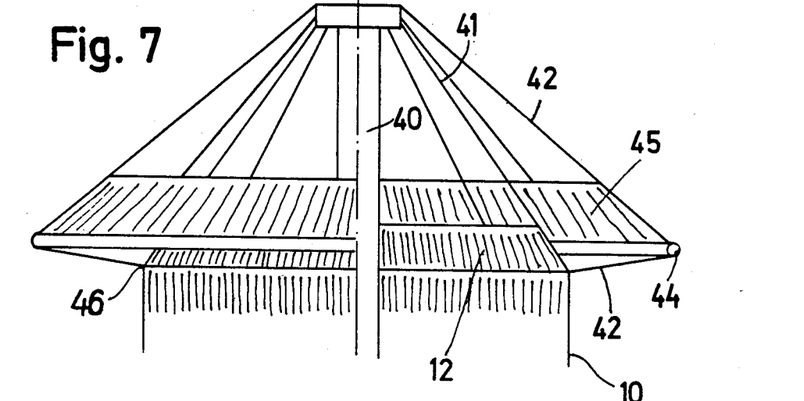
FIG. 7 is a partial elevation similar to FIG. 3, but partly in section, through another modified cooling tower crown according to the invention.
Figure 8:
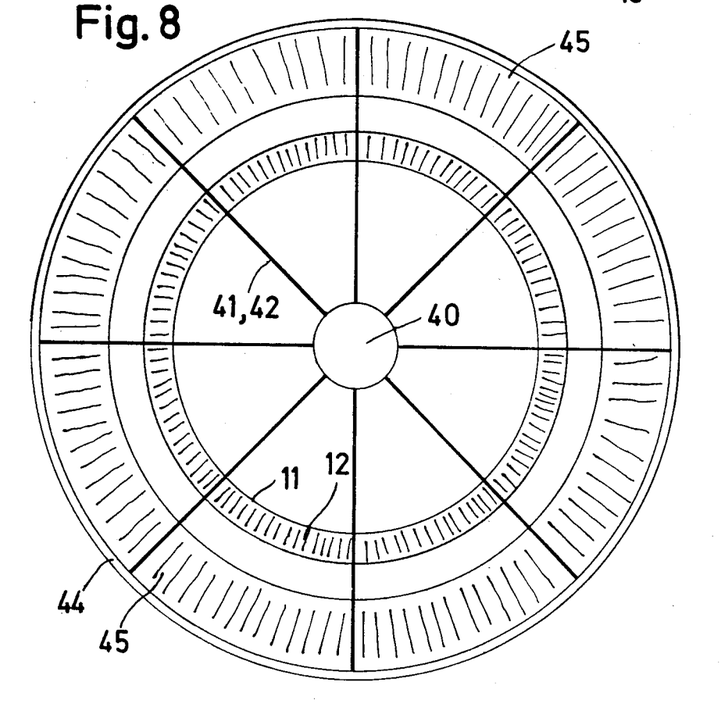
FIG. 8 is a top plan view of FIG. 7.

FIGS. 7 and 8 show a construction in which the cooling tower wall is suspended by means of cables 41 from a central, vertical mast 40. The cables 41 are fixed at the junction 46 between the tapered region 12 and the cylindrical wall 10 of the tower. Cables 42 having a relatively less steep inclination are tensioned between the top of the mast 43 and the circumference of the wall at 46 by means of a support ring 44. This support ring 44 is provided on the bottom edge of a conical wind-deflecting ring 45. With this construction, a conical annular wind-guiding duct is formed between the external wall of the tapered region 12 and the less steeply sloping internal wall of the wind-deflecting ring 45. If it should be desired for producing an even larger vertical component of the deflected side wind, a ring having a vertical outlet zone similar to the ring 18 in the construction illustrated in to FIGS. 3 and 5 can be fitted onto the external wall of the tapered crown region 12.

With the constructions according to FIGS. 3 and 9, any mixing of the side wind with the vapor beneath the outlet opening is avoided. This is important for an undisturbed functioning of the cooling tower.

The shell of the cooling tower can be erected by the usual known constructional methods, being made, for example, of concrete of sheet metal, or of a combined construction. In the latter case the shell will be made of concrete as far as the reduced or tapered region 12, this latter being made of sheet metal. In this arrangement, the tapered portion 12 will preferably be built up of a plurality of sheet metal ring elements, which are joined to one another along surface lines and are connected to one another, for example, by welding, bolting or riveting.

A concrete construction, which is frequently desired at the present time because of its economy, can be produced by the shuttering procedure which is known in the building industry, for example, using the conventional formwork method by which sections of the shell to be built are shuttered floor by floor, and the shuttering is filled with concrete, whereupon the concrete then sets. After the concrete of each section has set, the next section is then produced on the subjacent and already-set section in the same manner. The tapered crown region can also be produced in the same way.

By way of example, there are indicated below preferred specific dimensions for the tapered crown region 12 in respect of a cooling tower having the stated dimensions, it having been shown by the investigations of the inventors that such dimensions are able to reduce considerably or even to avoid completely cold air penetrations and the obstruction of the outlet area $F_2$ by side winds. For a cooling tower with a height of 100 meters and a diameter in the section $F_1$ (see FIG. 2) of D=52 meters, the axial length of the tapered crown portion should be 5 meters, the diameter of the outlet surface $F_2$ should be 46.5 meters, and the angle of slope of the tapered crown region 12 constructed conically with straight walls should be about 29° relative to the vertical.

As discussed above, it is desirable to minimize the draft losses caused by the tapering of the cooling tower crown while preventing cold air penetrations.

To meet this object it is provided, in accordance with the invention, that the angle between the tangent to the internal contour and the vertical in a crown region, whose height corresponds at most to 20% of the outlet diameter of the cooling tower, is not smaller than results from the following equation:

$$\tan\alpha(z) = \frac{1}{4} \cdot \frac{\rho_a - \rho_i}{\rho_i} \cdot g \cdot \frac{d_o}{w_o^2} \cdot \left(\frac{d(z)}{d_o}\right)^5 \quad (2)$$

in which $\alpha$ is the angle in question, g is the acceleration due to gravity, $\rho_a$ and $\rho_i$ are the gas densities inside (i) and outside (a) of the cooling tower, z is the vertical coordinate, $d_o$ and $d(z)$ are the diameters of the internal shell contour at the level z=0 and z, respectively and $w_o$ is the gas velocity at the level z=0.

If the angle of inclination of the tapered region is selected in accordance with the above formula, cold air penetrations are just prevented, in other words the flow in the cooling tower is just stable. If the angle of inclination with respect to the vertical becomes smaller, the flow will be unstable, i.e. cold air penetrations can no longer be excluded. If, on the other hand, the angle of inclination is greater than determined by the above formula, the flow becomes more stable so that cold air penetrations are avoided with greater certainty.

Absolute dimensions and operating conditions of the cooling tower, namely the diameter, velocities, and densities inside and outside of the cooling tower enter directly into the above formula. The critical angle of inclination defined in the above formula, below which angle stable operation no longer can be guaranteed, varies in response to these absolute dimensions in a manner which will be described in more detail below with reference to the figures.

If, at any location of the internal contour of the cooling tower, the angle in question complies with the above formula or is greater, stability in the areas above this location of the contour is given also if the angle either is maintained (conical tapering) or is enlarged still further (inwardly curved tapering). An inward curvature, at constant radius of curvature, of the internal contour in the tapered region is particularly convenient for building a concrete cooling tower to be produced by a shuttering procedure.

In practice, the radius of curvature conveniently corresponds to from once to twice the outlet diameter. The height or level at which the specific relation of the angle applies is advantageously situated in the range between 2 and 10% of the outlet diameter. In this so-called stabilized zone it is warranted that the pressure gradients inside of the crown be equal to or greater than the pressure gradient outside of the crown as discussed above in connection with Equation (2).

In the region of the crown configured in accordance with the invention, there is produced a barrier layer which prevents the penetration of cold air because the sum of the specific gravity of the vapor cloud and volume-related inertia forces is greater than the specific gravity of the outside air.

Equation (1) can be written as follows:

$$d(z) = d_e \cdot \left[1 + 2\frac{\rho_a - \rho_i}{\rho_i} \cdot g \cdot \frac{1}{w_o^2} \cdot \left(\frac{d_e}{d_o}\right)^4 \cdot (z - z_e)\right]^{-\frac{1}{4}} \quad (3)$$

in which $d_e$ is a diameter at the beginning or in the tapered region of the crown. In practice, $d_e$ may lie between 0.4 $d_o$ and 0.8 $d_o$.

The densities, the velocity $w_o$, and the diameter $d_o$ directly above the cooling tower installations included in equation (3) are predetermined for the cooling tower designer. Conveniently, he will select the diameter $d_e$ to be within the limits mentioned. Applying equation (3), the cooling tower designer can calculate the diameter d(z) corresponding to any level z above the level $z_e$ and thus obtain a "critical internal contour" along which the stability requirement of equation (1) is just fulfilled.

Conveniently, the cooling tower designer will choose a somewhat smaller diameter or slightly enlarge the angle of the tangent with respect to the vertical in order to be on the safe side, in other words to be able to absolutely guarantee stability. It will be safe, for instance, if the cooling tower designer provides for further inward curvature of the contour above the level $z_e$.

Figure 10:
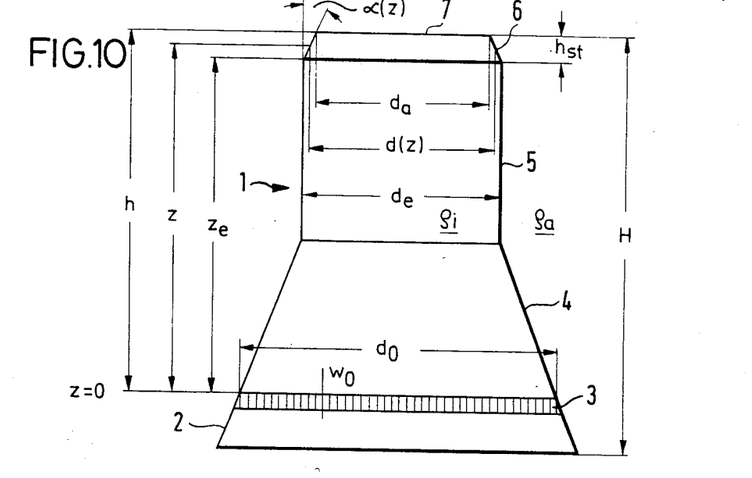
FIG. 10 is a dimensional outline of a cooling tower, including the essential dimensions for designing the crown region in accordance with the invention.
Figure 11:
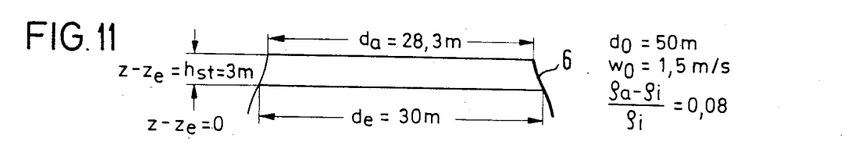
FIGS. 11 to 14 show crown regions of a plurality of cooling towers of different sizes the internal contours of the tapered crown regions complying with equation (3) at every point throughout their entire height.
Figure 12:
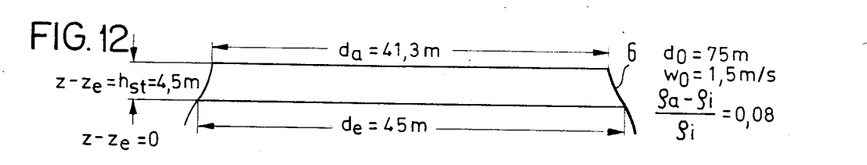
Figure 13:
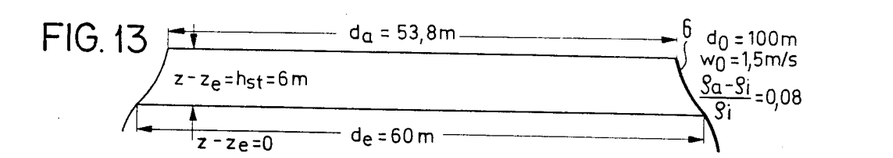
Figure 14:
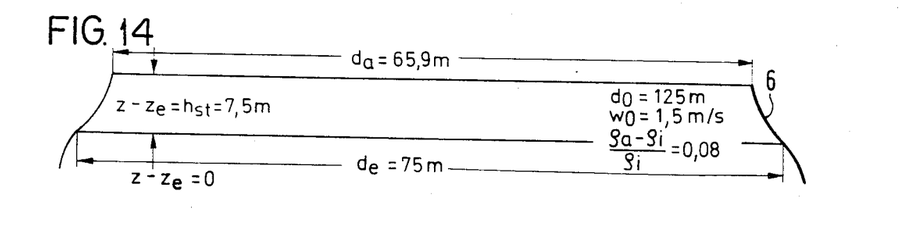

FIG. 10 is a diagrammatic presentation of a natural draught cooling tower, including the designations used in equations (1) to (3). The cooling tower shown has a shell 1 with inlet openings 62 for the ambient air at its bottom. After passing installations 63, usually in the form of dripping water separators or trickler units for water which trickles down and is to be cooled, the air flows into a constricted portion 4 and then reaches a cylindrical portion 65. Thereafter the ambient air or vapor is accelerated in a portion 66 which is tapered in accordance with the invention and, finally, it leaves the cooling tower through the outlet opening 67.

The dimensions shown in FIG. 10 have the following meanings:

| | |
|---|---|
| z — | The vertical coordinate (z = o at the base cross section) |
| $z_e$ — | level at which the stable portion 6 of the cooling tower begins |
| h — | height of the cooling tower flue |
| $h_{st}$ — | height of the stable portion of the cooling tower |
| H — | overall height of the cooling tower |
| $\alpha(z)$ — | angle between the tangent to the internal contour of the cooling tower in the stable portion and the vertical, at which angle stability is just reached, |
| $d_o$ — | diameter in the base cross section just above the installations 63 |
| $d_a$ — | diameter in the outlet cross section |
| d(z) — | diameter at level z |
| $d_e$ — | diameter at that location of the crown where the stable portion 66 begins |
| $w_o$ — | velocity of the vapor at the base cross section |
| $\rho a$ — | density of the vapor cloud outside of the cooling tower |
| $\rho i$ — | density of the vapor inside the cooling tower |
| g — | acceleration due to gravity |

The area of the shell 61 having the height h is called cooling tower flue. In a natural draft cooling tower or in a cooling tower with forced ventilation, comprising ventilators which are arranged for blowing, this flue begins above the installations, and in a forced ventilation cooling tower in which the ventilators are arranged for suction, it begins above the ventilators. Therefore, the cooling tower flue is that part of the cooling tower shell 61 in which the vapor flow is no longer decelerated or accelerated by built-in devices but only by changes in the shell shape, such as a constriction or an enlargement.

The height $h_{st}$ should amount no more than 20% of the outlet diameter $d_a$. Usually, the outlet diameter $d_a$ lies in the range of from 0.4 to 0.5 times the total height H so that the height $h_{st}$ of the stable portion could also be represented as a fraction of the overall height H.

The limitation indicated of the height $h_{st}$ of the stable portion is important because in this range the cooling tower is constricted according to the invention, thereby producing an acceleration of the vapor. However, accelerations in the crown region should be kept as small as possible in order to limit the losses in draft which are an unavoidable consequence of any acceleration. In practice, therefore, the value chosen for $h_{st}$ will be from 2 to 10%, preferably about 5% of the outlet diameter $d_a$.

If the tapered region is shaped as laid down in equation (1) or (3) it is just warranted that at any level z within the stable portion of the height $h_{st}$ the tapering or angle $\alpha$ (z) between the tangent to the tapered region and the vertical will be such that the cooling tower is "stable", in other words that penetrations of cold air are just prevented. Therefore, the angle $\alpha$ (z) is the minimum angle required to obtain stable conditions and for this reason it is also called "critical angle". The cooling tower designer who has to design a cooling tower will find the densities $\rho_a$, $\rho_i$, the velocity $w_o$ at the base cross section, the heights H and h to be predetermined approximately. Applying equation (1), he can then determine the critical angle $\alpha$ (z) at any level z of the region which is to be tapered in accordance with the invention. In this manner he will obtain the contour point by point for the respective conditions given in practice.

Examples for different critical angles $\alpha$ (z) at varying velocities $w_o$ at the base cross section and varying density conditions as well as varying conditions $d(z)/d_o$ are listed in Table 1.

TABLE 1

Critical angle $\alpha(z)$ in degrees for different values of $d_o$, $d(z)/d_o$, $w_o$, $\frac{\rho_a - \rho_i}{\rho_i}$

| | $\frac{\rho_a - \rho_i}{\rho_i} = 0.06$ | | | | | $\frac{\rho_a - \rho_i}{\rho_i} = 0.08$ | | | | | $\frac{\rho_a - \rho_i}{\rho_i} = 0.10$ | | | |
|---|---|---|---|---|---|---|---|---|---|---|---|---|---|---|
| | $d(z)/d_0$ | | | | | $d(z)/d_0$ | | | | | $d(z)/d_0$ | | | |
| $d_0$ in m | 0.4 | 0.5 | 0.6 | 0.7 | $d_0$ in m | 0.4 | 0.5 | 0.6 | 0.7 | $d_0$ in m | 0.4 | 0.5 | 0.6 | 0.7 |
| | | | | | | $w_0 = 1.0$ m/s | | | | | | | | |
| 50 | 4.3 | 12.9 | 29.8 | 51.0 | 50 | 5.7 | 17.0 | 37.3 | 58.8 | 50 | 7.2 | 21.0 | 43.6 | 64.1 |
| 75 | 6.4 | 19.0 | 40.6 | 61.7 | 75 | 8.6 | 24.7 | 48.8 | 68.0 | 75 | 10.7 | 29.9 | 55.0 | 72.1 |
| 100 | 8.6 | 24.7 | 48.8 | 68.0 | 100 | 11.4 | 31.5 | 56.8 | 73.1 | 100 | 14.1 | 37.5 | 62.3 | 76.4 |
| 125 | 10.7 | 29.9 | 55.0 | 72.1 | 125 | 14.1 | 37.5 | 62.3 | 76.4 | 125 | 17.4 | 43.8 | 67.2 | 79.0 |
| | | | | | | $w_0 = 1.5$ m/s | | | | | | | | |
| 50 | 1.9 | 5.8 | 14.3 | 28.8 | 50 | 2.6 | 7.8 | 18.7 | 36.2 | 50 | 3.2 | 9.7 | 23.0 | 42.5 |
| 75 | 2.9 | 8.7 | 20.9 | 39.5 | 75 | 3.8 | 11.6 | 27.0 | 47.7 | 75 | 4.8 | 14.3 | 32.4 | 54.0 |
| 100 | 3.8 | 11.6 | 27.0 | 47.7 | 100 | 5.1 | 15.2 | 34.1 | 55.7 | 100 | 6.4 | 18.8 | 40.3 | 61.4 |
| 125 | 4.8 | 14.3 | 32.4 | 54.0 | 125 | 6.4 | 18.8 | 40.3 | 61.4 | 125 | 7.9 | 23.1 | 46.7 | 66.4 |
| | | | | | | $w_0 = 2.0$ m/s | | | | | | | | |
| 50 | 1.1 | 3.3 | 8.1 | 17.2 | 50 | 1.4 | 4.4 | 10.8 | 22.4 | 50 | 1.8 | 5.5 | 13.4 | 27.3 |
| 75 | 1.6 | 4.9 | 12.1 | 24.9 | 75 | 2.2 | 6.6 | 16.0 | 31.7 | 75 | 2.7 | 8.2 | 19.7 | 37.7 |
| 100 | 2.2 | 6.6 | 16.0 | 31.7 | 100 | 2.9 | 8.7 | 20.9 | 39.5 | 100 | 3.6 | 10.8 | 25.5 | 45.9 |
| 125 | 2.7 | 8.2 | 19.7 | 37.7 | 125 | 3.6 | 10.8 | 25.5 | 45.9 | 125 | 4.5 | 13.5 | 30.8 | 52.2 |

The figures indicated in this table for the critical angle $\alpha$ (z), which is the angle at which stability is just obtained, disclose the following tendencies:

(1) At increasing diameter $d_o$ and increasing relationship $d(z)/d_o$ as well as at an increasing density ratio the critical angle $\alpha$ (z) must be made greater in order to obtain stability, i.e. to prevent cold air inrushes.

(2) At increasing velocity $w_o$ the critical angle $\alpha$ (z) must be made smaller.

In FIGS. 11 to 14 the inner contours are shown for the portion 66 in the area $z=z_e$ and $z=h$ for the figures also indicated in Table 1 of $d_o=50$, 75, 100, and 125 m, $w_o=1.5$ m/s, and $(\rho_a-\rho_i)/\rho_i=0.08$. At every level z along these internal contours an angle $\alpha$ (z) is realized at which stability is just obtained. It follows from FIGS. 11 to 14 that the angle $\alpha$ (z) increases at increasing diameter $d_o$. The height $h_{st}$ of the stable portion 66 is determined to correspond to approximately 0.1 $d_o$. The internal contours in the stable portion 66 according to FIGS. 11 to 14 are determined point by point by calculating on the basis of equation (3) the diameter d(z) belonging to each level z.

Thus the cooling tower constructor can determine the corresponding critical contour of the stable portion 66 for any given conditions in consideration of the stability requirement according to equation (1) or (3). Stability is always warranted if the tapering is made at an angle $\alpha$ which is greater than or corresponds to the critical angle $\alpha$ (z) on this contour. In practice, therefore, the cooling tower constructor will design the internal contour of the cooling tower in dependence on the material used for the cooling tower and in consideration of the manufacturing conditions such that this internal contour will always be within the limits of the critical contour so that stability will positively be obtained for any operating condition.

If the cooling tower is to be made, for example, of concrete, an internal contour with a constant radius of curvature is preferred in the crown region. Conveniently, this radius of curvature lies in the order of the diameter $d_1$ in the approximately cylindrical portion 65 of the shell. Then the cooling tower, including the tapered crown region can be built according to the shuttering procedure, using the formwork method.

The geometrical relations in this case provide the following:

$$\frac{d(z)}{d_1} = 2\cos\alpha - 1 \quad (4)$$

If equation (4) is inserted in equation (1) the result is:

$$\alpha = \arctan\left[\frac{1}{4}(2\cos\alpha - 1)^5 \cdot \frac{\rho_a - \rho_i}{\rho_i} \cdot \frac{d_1}{w_1^2}\right] \quad (5)$$

The solution of equation (5) provides a critical angle $\alpha$ ($z_e$) up to which the internal contour must be curved at least in order to fulfill the stability criterion. At this constriction corresponding to the vertical coordinate $z_e$ the stabilized portion 66 begins which in this case has a height $h_{st}$ of 5% of $d_1$. The circular contour in portion 66 having the height $h_{st}$ is tapered more strongly than the critical contour to be determined as explained above with reference to FIGS. 11 to 14 and shown in FIG. 17. The plume leaving the outlet is accelerated more by this somewhat greater tapering than by the critical contour, so that the stability is guaranteed even more positively, in other words cold air penetrations are prevented with greater certainty.

Figure 15:
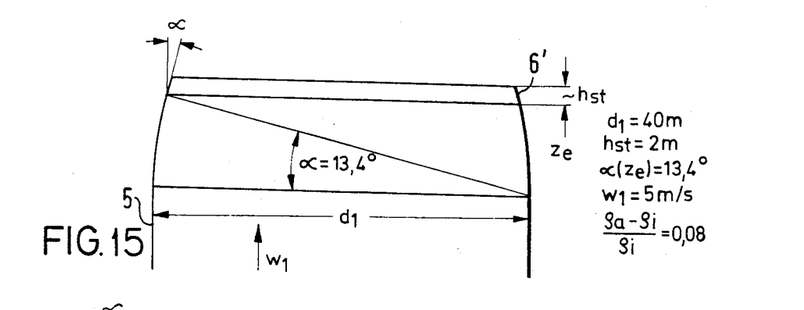
FIGS. 15 to 17 show crown regions curved according to the invention of a plurality of cooling towers of different sizes which are convenient to be realized in practice.
Figure 16:
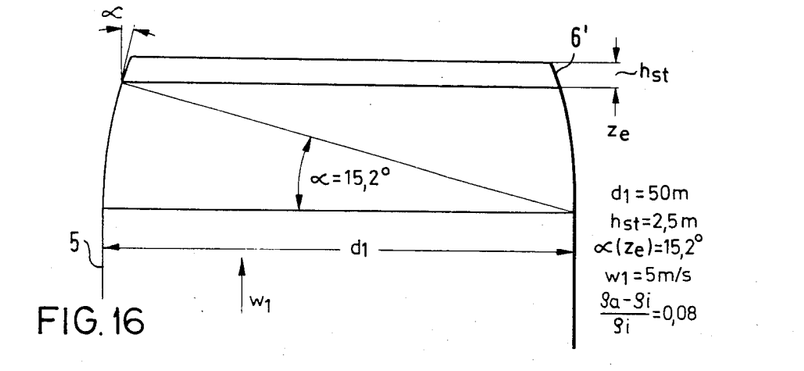
Figure 17:
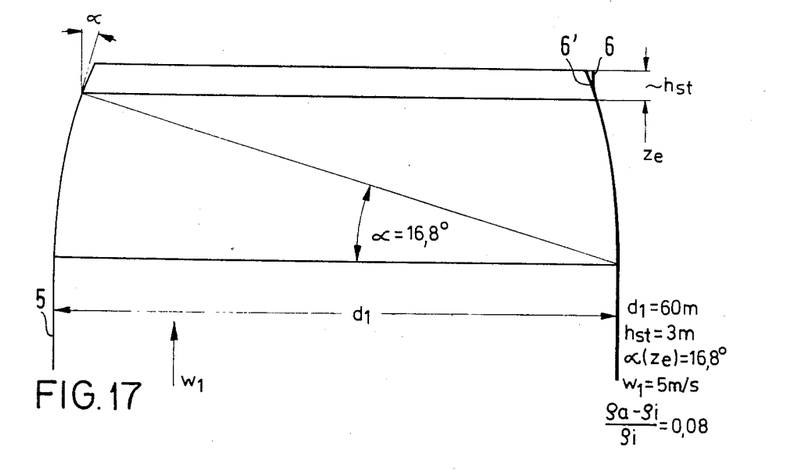

To demonstrate tendencies for the practical configuration in accordance with FIGS. 15 to 17 the critical angle $\alpha$ ($z_e$) is calculated for varying diameters $d_1$ and vapor velocities $w_1$, as follows from the table below. The density ratio $(\sigma_a - \rho_i)/\rho_i$ used is 0.08.

TABLE 2

Critical angle $\alpha(z_e)$ at an internal contour shaped like a circular arc, with $\frac{\rho_a - \rho_i}{\rho_i} = 0.08$

| $d_1$ (m) | $w_1$ (m/s) | | |
| --- | --- | --- | --- |
| | 4.0 | 5.0 | 6.0 |
| 40 | 17.1 | 13.4 | 10.4 |
| 50 | 19.0 | 15.2 | 12.2 |
| 60 | 20.5 | 16.8 | 13.7 |
| 70 | 21.7 | 18.1 | 15.0 |

This confirms the above mentioned tendencies: The angle $\alpha$ ($z_e$) increases at increasing diameter $d_1$ and decreasing velocity $w_1$. The tendencies shown make it clear that the crown region has to be tapered only slightly, i.e. at a small angle $\alpha$ in the case of cooling towers which are relatively slender compared to their overall height H and with which the velocity of the vapor in the crown is heigh. If, on the other hand, the cooling towers are large compared to their overall height H, the tapering must be more distinct if stable behavior is to be obtained, in other words, if cold air penetrations in operation are to be prevented.

Conditions prevailing with the usual chimneys or smokestacks (very slender structures, high outlet velocities) should practically make it unnecessary to taper the crown region in order to keep out the cold air. Or the minor tapering which is usually given for reasons of construction may be sufficient to prevent penetrations of cold air.

We claim:

1. In a natural draught cooling tower having a shell with a crown region inwardly tapered with respect to the vertical to provide an inlet/outlet diameter ratio sufficient to produce a pressure gradient inside said crown immediately adjacent the wall thereof equal to or greater than the pressure gradient outside said crown immediately adjacent the wall thereof and a crown height to total tower height ratio between about 1/33 and about 1/10, the improvement:

wherein the height of the crown region is not greater than twenty percent of the outlet diameter of the cooling tower;

wherein the angle $\alpha$ of the inclination of the internal contour of the shell in the crown region to the vertical is at least as great as:

$$\alpha \geq \arctan\left(\frac{g}{4}\right)\left(\frac{\delta a - \delta i}{\delta a}\right)\left(\frac{d0}{w0^2}\right)\left(\frac{d(z)}{d0}\right)^5$$

g = acceleration due to gravity;
$\delta a$ = gas density outside the cooling tower;
$\delta i$ = gas density inside the cooling tower;
z = the vertical coordinate;
d0 = internal diameter at z equal zero;
d(z) = internal shell diameter at the height z; and
w0 = gas velocity at z equal zero; and wherein the crown region is free of any additional wind deflector means.

2. A cooling tower as claimed in claim 1, wherein the internal contour of the shell is curved inwardly in the crown region.

3. A cooling tower as claimed in claim 2 wherein the internal contour of the shell has a constant radius of curvature in the crown region.

4. A cooling tower according to claim 3, wherein the radius of curvature of the shell is between 100% and 200% of the outlet diameter ($d_a$).

5. In a cooling tower of circular cross-section having a crown region with an opening defined by the upper rim of said crown region for discharging vapor, wherein the walls of said crown region converge so that the ratio of the cross-sectional area of the upper end of said crown region to the cross-section area of the lower end of said crown region is sufficient to produce a pressure gradient inside said crown immediately adjacent the wall thereof equal to or greater than the pressure gradient outside said crown immediately adjacent the wall thereof wherein the ratio of the vertical height of said crown region to the diameter of said crown region at the lower end thereof is between about 1/3 and about 1/12, and wherein the ratio of the crown region height to total tower height is between about 1/33 and about 1/10; and wherein the angle $\alpha$ of the inclination of the internal contour of the shell in the crown region to the vertical is at least as great as:

$$\alpha \geq \arctan\left(\frac{g}{4}\right)\left(\frac{\delta a - \delta i}{\delta a}\right)\left(\frac{d0}{w0^2}\right)\left(\frac{d(z)}{d0}\right)^5$$

$g$ = acceleration due to gravity;
$\delta a$ = gas density outside the cooling tower;
$\delta i$ = gas density inside the cooling tower;
$z$ = the vertical coordinate;
$d0$ = internal diameter at $z$ equal zero;
$d(z)$ = internal shell diameter at the height $z$; and
$w0$ = gas velocity at $z$ equal zero.

6. In a natural draught cooling tower of circular cross-section (a) having a crown with an upper rim for discharging vapor, (b) having means for preventing cold air break-ins at still air or winds of low velocity, including the convergence of the tower toward the upper end thereof where the ratio of the cross-sectional area of the rim of said crown to the cross-sectional area of the lower end of said crown is sufficient to produce a pressure gradient inside said crown immediately adjacent the wall thereof equal to or greater than the pressure gradient outside said crown immediately adjacent the wall thereof, (c) having a crown height to lower end diameter ratio between about 1/3 and about 1/12; (d) having a crown height to tower height ratio between about 1/33 and about 1/10, and (e) having deflector means external of the tower and operative for upwardly deflecting lateral winds to a substantially vertial direction to thereby inhibit the formation of a vortex extending over a portion of the top of the cooling tower on the windward side thereof, the improvement:

wherein the angle $\alpha$ of the inclination of the internal contour of the shell in the crown region to the vertical is at least as great as:

$$\alpha \geq \arctan\left(\frac{g}{4}\right)\left(\frac{\delta a - \delta i}{\delta a}\right)\left(\frac{d0}{w0^2}\right)\left(\frac{d(z)}{d0}\right)^5$$

$g$ = acceleration due to gravity;
$\delta a$ = gas density outside the cooling tower;
$\delta i$ = gas density inside the cooling tower;
$z$ = the vertical coordinate;
$d0$ = internal diameter at $z$ equal zero;
$d(z)$ = internal shell diameter at the height $z$; and
$w0$ = gas velocity at $z$ equal zero.

7. A cooling tower as claimed in claim 6, wherein the internal contour of the shell is curved inwardly in the crown region.

8. A cooling tower as claimed in claim 7, wherein the internal contour of the shell has a constant radius of curvature in the crown region.

9. A cooling tower according to claim 8, wherein the radius of curvature of the shell is between 100% and 200% of the outlet diameter ($d_a$).

* * * * *